United States Patent
Spencer

(10) Patent No.: US 11,649,021 B2
(45) Date of Patent: May 16, 2023

(54) MARINE SURVEILLANCE AND DEBRIS SCOW

(71) Applicant: Shift Environmental Technologies Ltd., Nanaimo (CA)

(72) Inventor: James Spencer, Nanaimo (CA)

(73) Assignee: Shift Environmental Technologies, LTD

( * ) Notice: Subject to any disclaimer, the term of this patent is extended or adjusted under 35 U.S.C. 154(b) by 392 days.

(21) Appl. No.: 17/069,661

(22) Filed: Oct. 13, 2020

(65) Prior Publication Data

US 2021/0107608 A1 Apr. 15, 2021

(30) Foreign Application Priority Data

Oct. 11, 2019 (CA) .................................. CA 3058860

(51) Int. Cl.
| | |
|---|---|
| *B63B 79/10* | (2020.01) |
| *B63B 3/48* | (2006.01) |
| *G05D 1/00* | (2006.01) |
| *B63H 11/00* | (2006.01) |
| *B63B 35/32* | (2006.01) |

(52) U.S. Cl.
CPC ................. *B63B 79/10* (2020.01); *B63B 3/48* (2013.01); *B63B 35/32* (2013.01); *B63H 11/00* (2013.01); *G05D 1/0038* (2013.01)

(58) Field of Classification Search
CPC ......... B63B 35/00; B63B 35/28; B63B 35/32; B63B 79/10; B63B 3/48; B63H 11/00; G05D 1/0038
USPC ........................... 114/26, 31, 61.25, 256, 292
See application file for complete search history.

(56) References Cited

U.S. PATENT DOCUMENTS

| | | | |
|---|---|---|---|
| 3,115,860 A * | 12/1963 | Payne | .................... B63B 1/125 114/283 |
| 3,887,953 A * | 6/1975 | Eisenhauer | ............... B63C 9/04 244/137.2 |
| 5,354,222 A | 10/1994 | Elias | |
| 7,673,355 B2 | 3/2010 | Fischer | |
| 8,991,835 B1 | 3/2015 | Wolf et al. | |
| 10,035,570 B1 | 7/2018 | Barron | |
| 10,086,918 B2 | 10/2018 | Pepper et al. | |
| 2017/0001694 A1 | 1/2017 | Hayward et al. | |

FOREIGN PATENT DOCUMENTS

FR 2840279 12/2003

\* cited by examiner

*Primary Examiner* — Daniel V Venne
(74) *Attorney, Agent, or Firm* — Baumgartner Patent Law; Marc Baumgartner

(57) ABSTRACT

A marine monitoring and debris collection scow is provided, the scow comprising: a hull which includes an open stern, a bow opposite the open stern, a deck extending between the open stern and the bow and forming a bottom on an underside, the bottom extending between the open stern and the bow; a frame, the frame which is attached to the deck, the frame including a front, a back which is opposite the front and sides extending between the front and the back; at least one flotation chamber which extends around the sides and the front of the frame and forms a gunwale; a housing mounted on the deck; and a microcontroller unit housed in the housing, the microcontroller unit configured to receive a data set from at least one sensor, to store the data set, to process the data set into a processed data set and to send the processed data set to a radio.

14 Claims, 14 Drawing Sheets

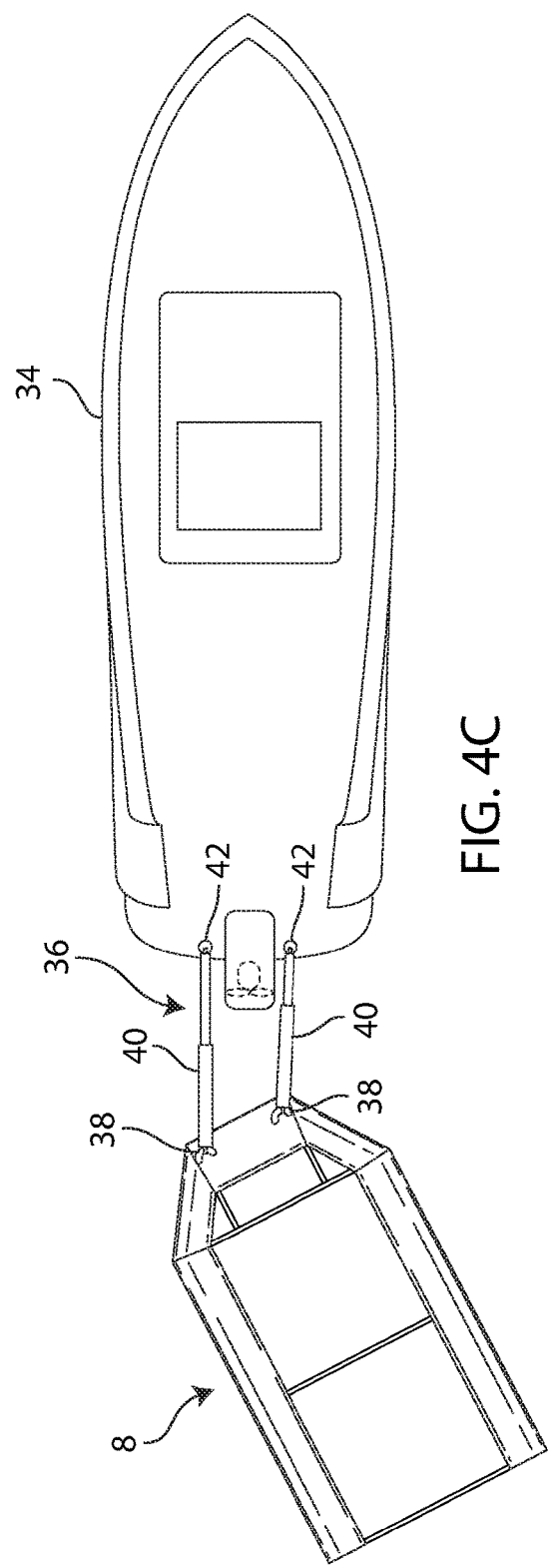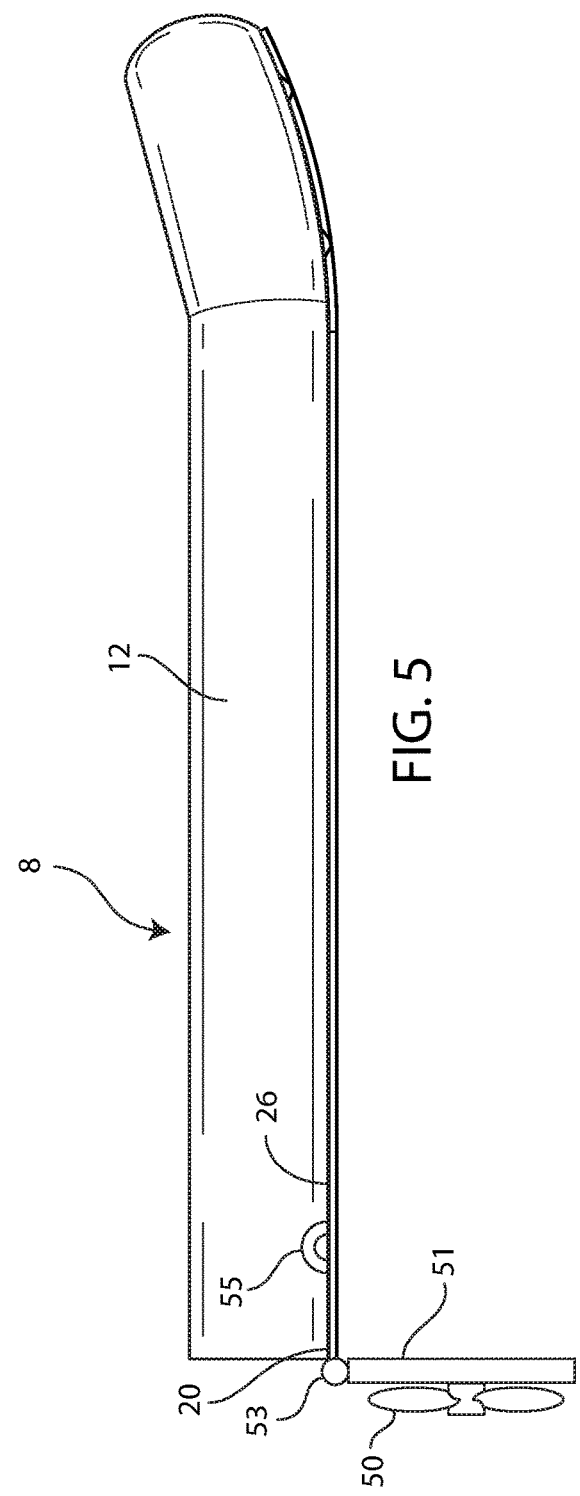

MARINE SURVEILLANCE AND DEBRIS SCOW

CROSS REFERENCE TO RELATED APPLICATION

The present invention is related to, and claims the benefit of Canadian Patent Application Serial No. 3,058,860, filed on Oct. 11, 2019, and entitled MARINE DEBRIS SCOW and which is hereby incorporated in its entirety including all tables, figures, and claims.

FIELD

The present technology is directed to a rigid hull inflatable scow for spill surveillance, environmental monitoring, assessing, reporting and responding as well as for carrying debris collected on the shore. More specifically, it is a scow that can withstand the rigors of traveling through the surf zone, being carried or dragged on shore and on beaches and being towed at high speed behind a support vessel whether loaded or empty.

BACKGROUND

U.S. Pat. No. 10,086,918 discloses an inflatable structure that includes continuous longitudinal and axial curves, constructed to form a hydrodynamically designed performance platform for use as a performance water sports board, rescue board, or rescue sled, such as a stand-up paddle board, paddleboard, surfboard, PWC rescue sled, bodyboard, or other floating or dynamic platform. Alternatively, it may be adapted for use with additional structure to provide an inflatable hull and floor for a watercraft, such as a boat, raft, life-raft, rescue craft, or other floating or dynamic platform. Longitudinal stringers welded to opposing panels defining the interior volume of the inflatable structure are joined by welding, gluing, or lashing, and the shape of the stringers and the welding/gluing/lashing schedule can be employed to give the inflatable structure a highly customized curved shape. This structure would not be suitable for transporting beach debris. The hull would be subject to tearing on rocky shores. The disclosed hull shape would be prone to cavitation in the wake of a tow boat and could potentially nose-dive. The inclusion of fins would preclude using the board for transporting debris as the board would have to be dragged along the shore.

U.S. Pat. No. 10,035,570 discloses a water propulsion water rescue board with an integrated water propulsion jet to provide additional thrust for rescue maneuvers and different selectable thrust levels as needed during the maneuver. The water propulsion water rescue board includes a body having an upper surface and bottom surface, a length between nine feet and eleven feet from nose to tail, a thickness between 3.5 and 6 inches, and a water propulsion system integrated into the body including a water inlet on the bottom surface, and a water propulsion nozzle and propeller on the upper surface. An electric motor connects to rotate propeller for drawing water into the propulsion system and expels a pressurized column of water through the water propulsion nozzle. A removable rechargeable battery is connected with the electric motor and a controller with a user control pad on the top surface of the body to allow the user to control the operation of the water propulsion system. The disclosed board shape would be prone to cavitation in the wake of a tow boat and could potentially nose-dive as it lacks a bow. The inclusion of fins would preclude using the board for transporting debris as the board would have to be dragged along the shore. Further, the inlet would likely become plugged from dragging it through intertidal debris and mud, sand, gravel and silt. This is basically a surfboard and would not be suitable for high speed towing or any significant payload.

U.S. Pat. No. 8,991,835 discloses lightweight inexpensive sleds, made of tough plastic or similar material, are disclosed for transporting injured people or inert loads. Tensile towing forces applied to a strap are distributed to avoid tearing the sled body. The sled would be subject to tearing on rocky shores. The disclosed sled would be prone to cavitation in the wake of a tow boat and could potentially nose-dive as it lacks a bow. The disclosed sled would not be strong enough to withstand the force of waves in the surf zone nor would it withstand being dragged when on the shore. The disclosed sled is simply attached to the tow boat with a rope. It lacks any means for promoting linear travel and controlled turning.

U.S. Pat. No. 7,673,355 discloses a flat, sturdy rescue board that is shaped like a sled. The long edges of the board platform have wings for attaching handles or arm hooks to the platform. A rotatable handle is attached to each wing. Each handle can rotate ninety degrees only. The handles are normally parallel to the top of the board surface but may be rotated ninety degrees so that they are perpendicular to the board. When a victim is loaded onto the board the handles may be used to extricate the board and victim from the dangerous situation. Semi-circular arm hooks may also be attached to each wing. When a victim is loaded onto the board, his arms are positioned above the hooks. When the board is pulled to safety the victim remains secured to the board by the arm hooks. The board also has lower rails attached to the bottom of the board for sliding the board along ice or on long the ground. The disclosed board would be prone to cavitation in the wake of a tow boat and could potentially nose-dive as it lacks a bow. The disclosed board would not be strong enough to withstand the force of waves in the surf zone, nor would it withstand being dragged when on the shore. The disclosed board is simply attached to the tow boat with a rope.

U.S. Pat. No. 5,354,222 discloses a water rescue sled for towing an incapacitated victim behind a personal watercraft has a buoyant body configured to support a recumbent victim thereupon. A coupling attaches the buoyant body to the personal watercraft in a manner providing at least two degrees of freedom so as to minimize stresses to both the personal watercraft and the water rescue sled during use thereof. The water rescue sled preferably further comprises a plurality of ties for facilitating securing of a victim disposed upon the buoyant body thereto. Ropes, straps, webbing, etc. may be attached to the ties and placed over the victim so as to maintain the victim safely upon the upper surface of the buoyant body. The ties are preferably configured as handles so as to facilitate carrying of the water rescue sled and victim. Thus, the water rescue sled of the present invention may optionally function as a backboard for maintaining the spine in a straight and immobile configuration during transport. The disclosed sled would be prone to cavitation in the wake of a tow boat and could potentially nose-dive as it lacks a bow. The disclosed sled would not be strong enough to withstand the force of waves in the surf zone nor would it withstand being dragged when on the shore. The water rescue sled is simply tethered to a personal watercraft.

United States Patent Application 20170001694 discloses a sports board that includes an elongate, water impervious, thermoplastic foam core having an upper surface and an under surface; an upper layer covering at least a portion of the upper surface; and an under layer covering at least a portion of the under surface. The foam core is made of a foamed material having a water absorption (measured according to ASTM C-272) of less than 2 volume percent. The disclosed board would be prone to cavitation in the wake of a tow boat and could potentially nose-dive. The disclosed hull would not be strong enough to withstand the force of waves in the surf zone nor would it withstand being dragged when on the shore.

FR2840279 discloses an assistance board or stretcher (1) that is composed of a board cover and an interior board and a fixing and stowing system (6,12,13,17) allowing the lateral holding of the stretcher and resisting the force exerted by the nautical vehicle (2). The disclosed board would be prone to cavitation in the wake of a tow boat and could potentially nose-dive. The disclosed board would not be strong enough to withstand the force of waves in the surf zone nor would it withstand being dragged when on the shore.

What is needed is a debris scow that is designed to carry the weight of bags of debris both on the shore and in the water and to conduct ocean surveys including spill surveillance. The hull would preferably be light weight and lack any protrusions such as a keel or fins. The hull would preferably be tough enough to be dragged over sand, gravel and small rocks without tearing or being otherwise damaged. It would be preferable if it was light enough to be carried by two people and to fit in the box of a pickup truck. It would be preferable if the scow was provided with at least one flotation chamber to allow it to carry heavy loads. It would be further preferable if the scow included handholds and a harness for attaching the scow to the transom of a tow vessel. It would be further preferable if the harness was adjustable so that the position of the scow was optimized for maneuverability. It would be further preferable if the scow was designed to be towed at high speeds and to not cavitate. It would be further preferable if the scow was remotely controlled or autonomous and autonomously collected data from a plurality of sensors associated with the scow, whether onboard, towed, float mounted, tethered and the like.

SUMMARY

The present technology is a sled that is designed to carry the weight of bags of debris both on the shore and in the water and to conduct ocean surveys including spill surveillance. The hull lacks any protrusions that might be broken, such as a keel or fins. The hull is tough enough to be dragged over sand, gravel and small rocks without tearing or being otherwise damaged. The scow is light enough to be carried by two people and can fit in the box of a half-ton pickup. The scow has inflatable chambers that are attached to the hull and provide buoyancy, which allows the scow to be used for carrying heavy loads. The scow includes handholds and a harness for attaching the scow to the transom of a tow vessel. The harness is adjustable so that the position of the scow is optimized for maneuverability. The scow is designed to be towed at high speeds and to not cavitate. The scow can operate autonomously or it can be remotely controlled. It autonomously collects data from a plurality of sensors associated with the scow, whether onboard, towed, float mounted, tethered and the like.

In one embodiment, a marine environmental monitoring scow is provided, the marine environmental monitoring scow comprising: a hull which includes an open stern, a bow opposite the open stern, a deck extending between the open stern and the bow and forming a bottom on an underside, the bottom extending between the open stern and the bow; a frame, the frame which is attached to the deck, the frame including a front, a back which is opposite the front and sides extending between the front and the back; at least one flotation chamber which extends around the sides and the front of the frame and forms a gunwale; a housing mounted on the deck; and a microcontroller unit housed in the housing, the microcontroller unit configured to receive a data set from at least one sensor, to store the data set, to process the data set into a processed data set and to send the processed data set to a receiver.

The marine environmental monitoring scow may further comprise at least one flap pivotally mounted on the back of the frame.

The marine environmental monitoring scow may further comprise one or more thrusters mounted on the flap.

In the marine environmental monitoring scow, the microcontroller unit may be in electronic communication with the thrusters.

In the marine environmental monitoring scow, the bottom of the hull may include a plurality of strakes which extend from the bow to the stern.

In another embodiment, a combination of a transom mounting assembly, a scow, and a tow vessel is provided, the transom mounting assembly mounted on the tow vessel and including at least two arms, and a pair of clips proximate a terminal end of each arm, the scow releasably attached to the tow vessel with the clips of the transom mounting assembly, wherein the scow comprises: a hull which includes an open stern, a bow opposite the open stern, a deck extending between the open stern and the bow and forming a bottom on an underside, the bottom extending between the open stern and the bow; a frame, the frame which is attached to the deck, the frame including a front, a back which is opposite the front and sides extending between the front and the back; and at least one flotation chamber which extends around the sides and the front of the frame and forms a gunwale.

The combination may further comprise a flap which is hingedly attached to the deck proximate the open stern.

The combination may further comprise one or more thrusters mounted on the flap.

In the combination, the transom mounting assembly may include a tow bar, the tow bar mounted on the terminal ends of the arms for locating underneath the hull proximate the stern.

The combination may further comprise a pair of rings mounted on the back of the frame of the scow for releasably attaching the arms.

The combination may further comprise a housing mounted on the scow and a microcontroller unit housed in the housing, the microcontroller unit configured to receive a data set from at least one sensor, to store the data set, to process the data set into a processed data set and to send the processed data set to a radio.

The combination may further comprise at least one environmental monitoring sensor.

In the combination, the microcontroller unit may be in electronic communication with the thrusters.

In another embodiment, a method of monitoring a marine environment is provided, the method comprising: an operator deploying a scow which includes a microcontroller unit in to the marine environment which includes a plurality of marine environmental sensors; the environmental sensors communicating at least one data set to the microcontroller unit; the microcontroller unit receiving the data set, storing the data set, processing the data set into a processed data set and sending the processed data set to a receiver, thereby responding to a spill in the marine environment.

In the method, the monitoring may be autonomous.

The method may further comprise the microcontroller unit receiving navigation data and autonomously positioning the scow.

The method may further comprise the scow deploying at least one containment device.

In the method, the scow may contain the spill with the at least one containment device.

In the method, the scow may contain the spill autonomously.

The method may further comprise an unmanned aerial vehicle wirelessly communicating visual data to the microcontroller unit.

FIGURES

FIG. 4C is a top view of the transom mounting assembly with the arms adjusted to be different lengths.

FIG. 5 is a longitudinal sectional view showing thrusters hingedly attached to the stern.

DESCRIPTION

Figure 1:
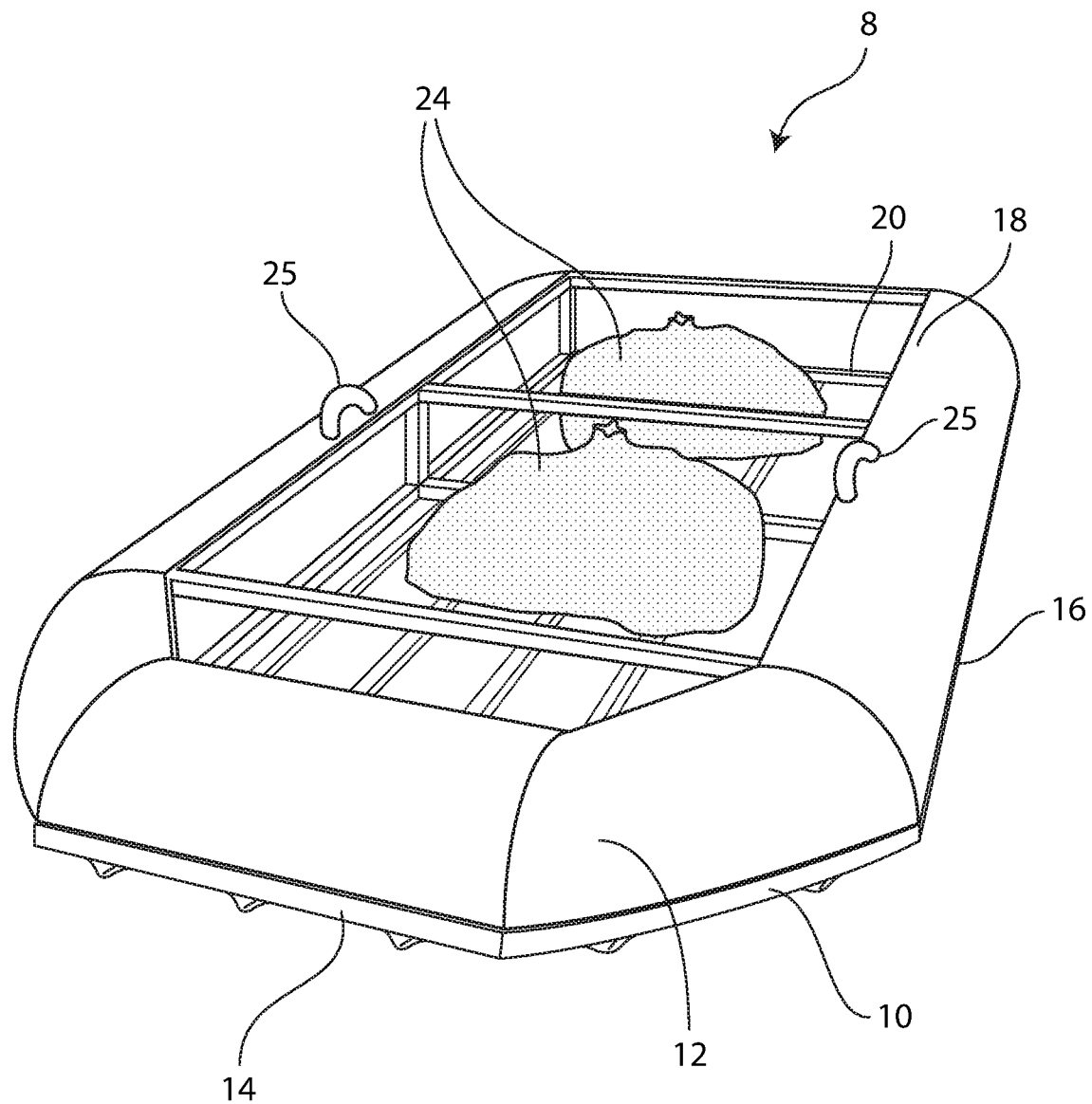
FIG. 1 is a perspective view of the scow of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions:

Sled—in the context of the present technology, a sled is synonymous with a scow.

Marine surveillance and debris scow—in the context of the present technology, the scow can be used for one or more of marine surveillance, marine environmental monitoring and for collecting debris.

IoT—in the context of the present technology, IoT is the internet of things.

GPS—in the context of the present technology, GPS is synonymous with GNSS.

IO—in the context of the present technology, IO is input/output.

Marine environmental sensor—in the context of the present technology, a marine environmental sensor is a sensor that provides data on physical, chemical and biological metrics including: water quality, chemical spills, oil spills, water composition, water temperature, oceanographic and biological indicators via remote sensing and direct sampling and the like. Marine environmental sensors do not include sensors for navigation.

DETAILED DESCRIPTION:

A scow, generally referred to as 8 is shown in FIG. 1. The scow 8 has an aluminum hull 10 and at least one flotation chamber 12 which is either inflatable or is foam-filled and extends around the bow 14 and sides 16 of the hull 10. The flotation chamber 12 forms the gunwale 18 of the scow 8. The scow 8 does not have a transom, in other words it has an open stern 20. The bow 14 is designed to reduce the resistance of the hull 10 cutting through water and is tall enough to prevent water from easily washing over the top of it. Two debris bags 24 are shown in the scow 8. The bow 14 is curved upwards. Two handholds 25 are located on the flotation chamber 12.

In an alternative embodiment the hull is a carbon fiber hull.

Figure 2:
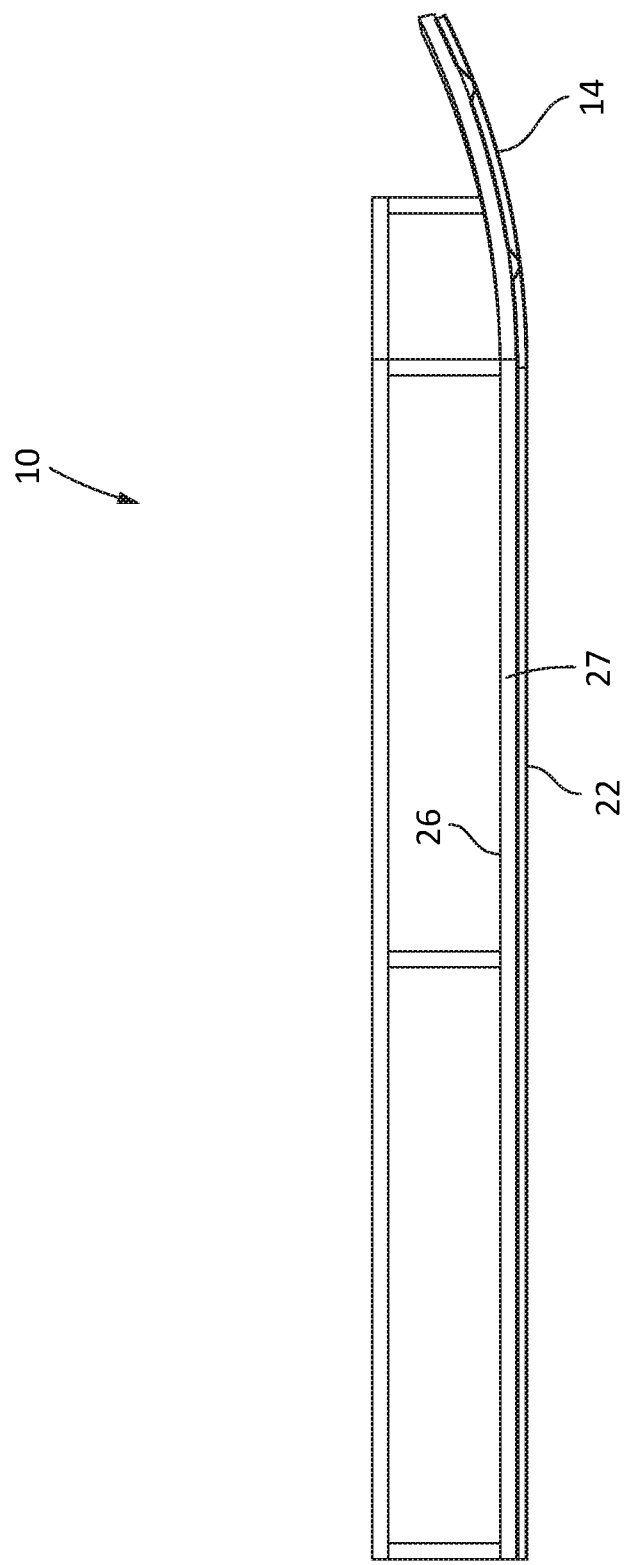
FIG. 2 is a longitudinal sectional view of the scow of FIG. 1.

As shown in FIG. 2, the hull 10 has a flat bottom 22, which allows it to hydroplane. This also makes it suitable for being dragged along beaches. The deck 26 is also flat with a curved bow 14. A foam core 27 is housed in the space between the deck 26 and the hull 10 The sides 16 are about 15 centimeters tall.

Figure 3:
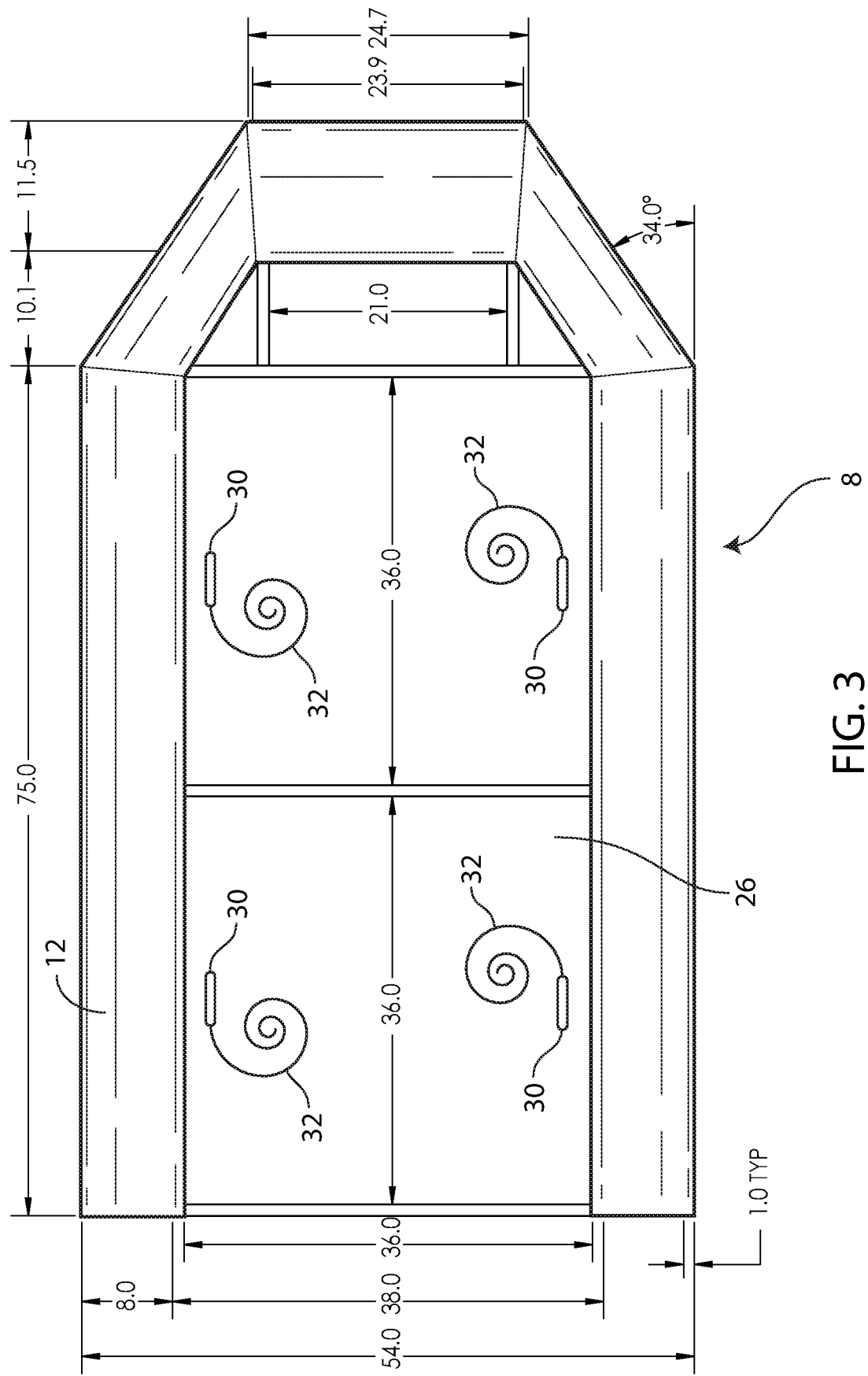
FIG. 3 is a top view of the scow.

As shown in FIG. 3, the scow 8 is about 3 meters long and about 70 to about 85 centimeters wide on the inside and about 100 to about 115 centimeters wide on the outside. The flotation chamber 12 is about 12 to about 20 centimeters in diameter. The flotation chamber 12 is located such that it is partially in the water when the scow 8 is loaded. Without being bound to theory, this allows the flotation chamber to absorb some of the shock of waves and wake, thus reducing wear on the hull 10, retaining lines and debris bags 24. The flotation chamber 12, however, is protected by the hull 10 as the hull 10 extends outward beyond the flotation chamber 12. The scow 8 weighs about 25 to about 30 kilograms. Continuing on FIG. 3, a plurality of holdfasts 30, which are preferably cleats 30, are attached to the deck 26. Retention lines 32 are for holding the debris bags 24 in place.

In one embodiment, the flotation chambers are located on the sides 16 and extend below the bottom 22 of the scow 8. This creates a multi-hull design which further absorbs some of the shock of waves and wake and further promotes hydroplaning.

In both designs, the scow 8 is purpose built to accommodate up to 400 kilogram payload and can travel at up to ten knots through hazardous marine environments. The debris bags 24 are 34"×34"×36" when filled.

Figure 4A:
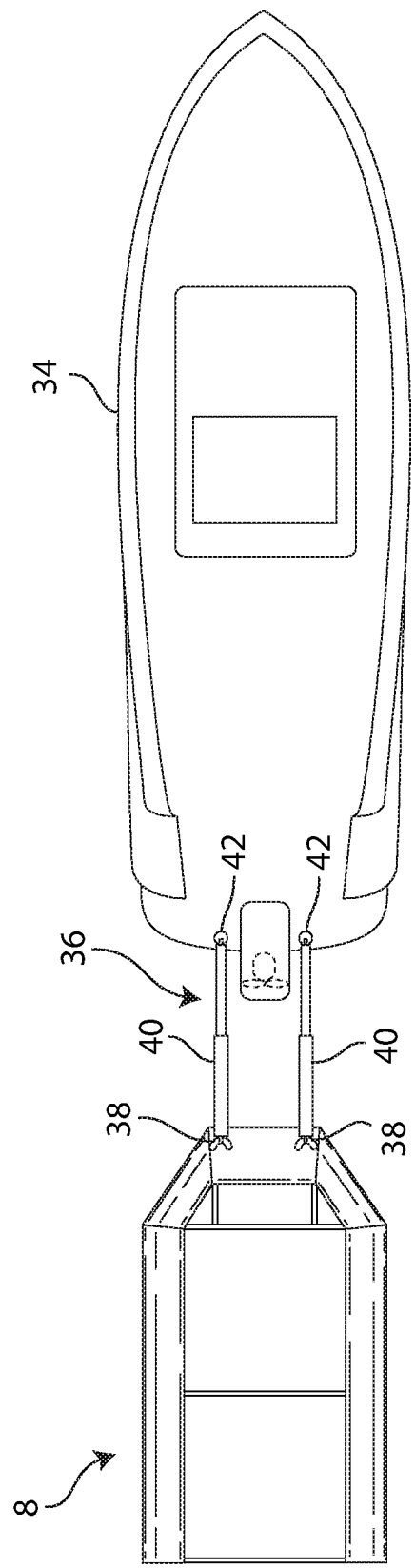
FIG. 4A is a top view of the transom mounting assembly of the scow of FIG. 1 with the arms extended.
Figure 4B:
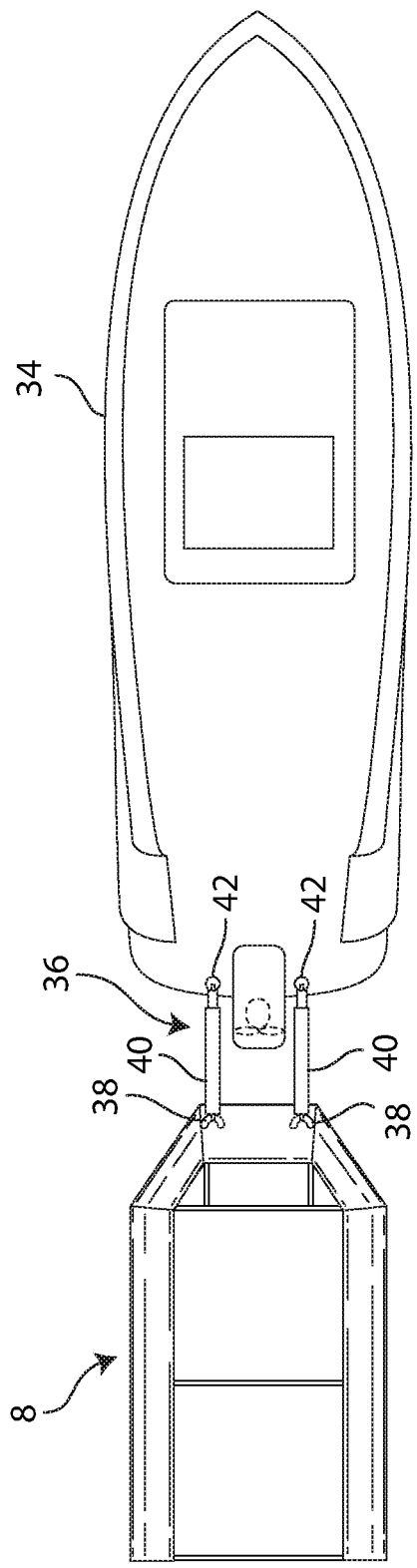
FIG. 4B is a top view of the transom mounting assembly with the arms retracted.

As shown in FIG. 4A, the scow 8 is connected to the tow vessel 34 with a transom mounting assembly, generally referred to as 36. Two D rings 38 are mounted on the bow 14. Each D ring 38 has an arm 40 extending from it to the transom mount 42 on the tow vessel 34. The length of the arms 40 is adjusted such that the scow 8 is located on the hydraulic trough wave of the tow vessel 34. As this varies from tow vessel to tow vessel, the arm 40 are extendable (FIG. 4A) and retractable (FIG. 4B) and are preferably telescoping or articulating. As shown in FIG. 4C, as the length of each arm 40 can be adjusted independently, the angle of the scow 8 relative to the tow vessel 34 can also be adjusted. The arms 40 are releasably attached to the D rings 38 with clips 44. These allow for quick release of the scow 8.

As shown in FIG. 5, in one embodiment, the scow 8 has two thrusters 50 that provide thrust and directional control for travel of the scow 8 to and from beaches and headlands either loaded or unloaded. The thrusters 50 are located on a flap 51 which is attached with a hinge 53 or hinges to the deck 26 proximate the open stern 20. The flap 51 can be flipped onto the deck 26 and in that position, is retained with a fastener 55, such as a cotter pin. In one embodiment the flaps 51 are bars with quick release ball lock pins for releasably affixing them in the storage position and deployed position.

Figure 6:
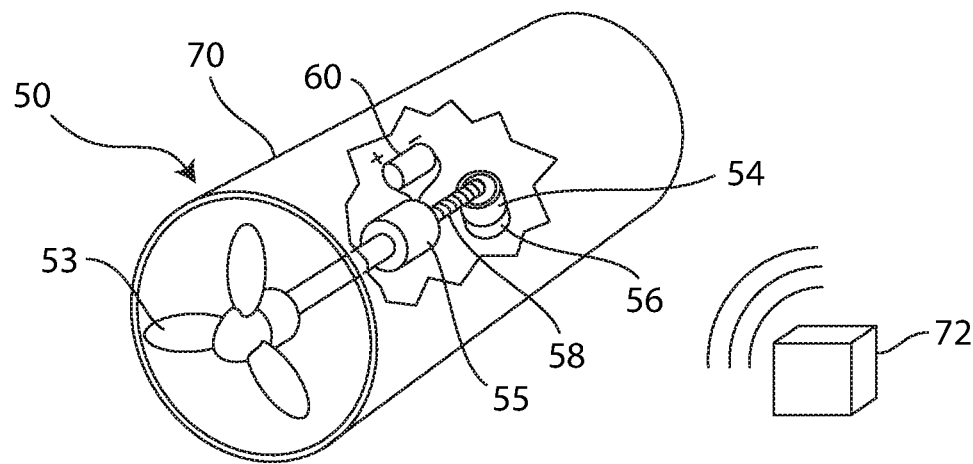
FIG. 6 is a schematic of the electronics of the thruster controls shown in FIG. 5.

As shown in FIG. 6, the thrusters 50 (which include the propeller 53 and motor 55) are under control of a microcontroller unit 54 (MCU) which includes a wireless receiver 56. The wireless receiver 56 may be a Bluetooth receiver or transceiver. It operates on a preprogrammed dedicated channel and is controlled by the microcontroller unit 54. The microcontroller unit 54 is in electrical communication with two electro-mechanical linkages 58, which may be, but is not limited to a linear actuator, a worm drive stepper or a servo. Each electro-mechanical linkage 58 is in mechanical communication with one of the thrusters 50. At least one battery 60 powers the thrusters 50, the microcontroller unit 54 and the electro-mechanical linkages 58. A Global Navigation Satellite System (GNSS) 55 is included and is in electronic communication with the microcontroller unit 54. The microcontroller unit 54 is configured to include GNSS navigation protocols. The microcontroller unit 54 with its wireless receiver 56 and GNSS 55 are housed in a waterproof, resilient housing 70 which is affixed to the scow 8.

The tow vessel 34 has a wireless transmitter 72.

In one embodiment, both the scow 8 and the tow vessel 34 have transceivers (referred to as the scow transceiver and the tow vessel transceiver respectively) rather than a receiver and a transmitter respectively. The scow transceiver 56 emits a signal. The tow vessel transceiver 72 is configured to search for a signal from the scow transceiver 56. A secure connection is then made between the tow vessel transceiver 72 and the scow transceiver 56 using Bluetooth protocols. Once a secure connection is established the user activates and controls the thrusters 50.

In another embodiment, the scow 8 has a receiver 56 and the tow vessel 34 has a transmitter 72.

In yet another embodiment, communication is via WiFi (IEEE 802.11). The tow vessel 34 has a WiFi transceiver 72. The scow 8 also has a WiFi transceiver 56. The tow vessel WiFi transceiver 72 is configured to search for a signal from the scow WiFi transceiver 56. Once the signal is identified, a secure connection is then made between the tow vessel WiFi transceiver 72 and the scow WiFi transceiver 56 using IEEE 802.11 protocols. Once a secure connection is established the user activates and controls the thrusters 50.

In yet another embodiment, Radio Frequency Identification (RFID) is used to communicate between the tow vessel 34 and the scow 8. The tow vessel 34 has a radio transmitter 72. Ultra High Frequency (UHF) RFID is used (the frequency is about 300 MHz to about 960 MHz). The scow 8 has a reader 56. Once a secure connection is established the user activates and controls the thrusters 50.

In yet another embodiment, infrared light is used to communicate between the tow vessel 34 and the scow 8. The tow vessel 34 has an infrared light transmitter 72. The scow 8 has a reader 56. Once a secure connection is established the user activates and controls the thrusters 50.

Figure 7:
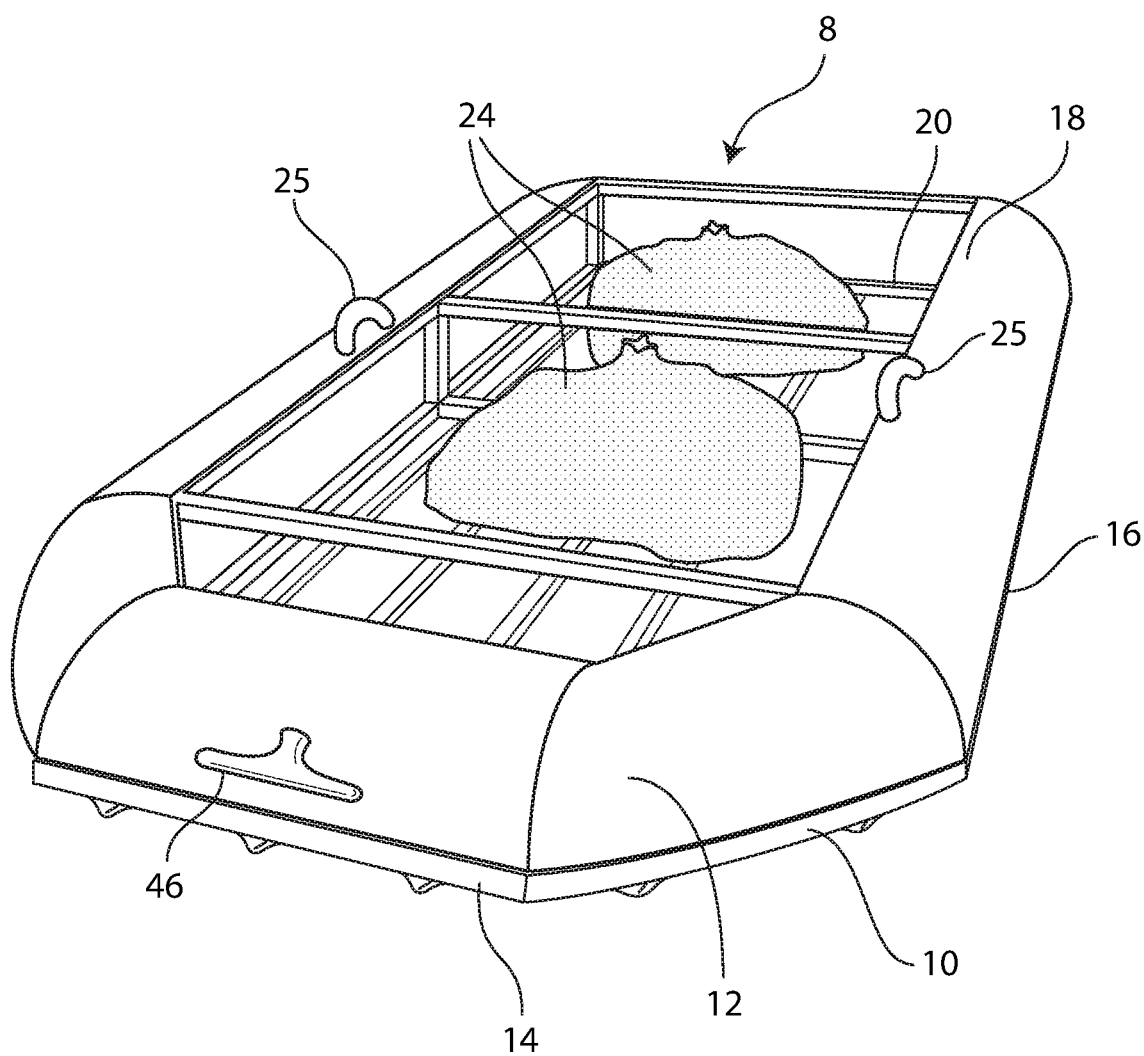
FIG. 7 is a perspective view of an alternative embodiment of the scow.

In one embodiment shown in FIG. 7, once the tow vessel 34 reaches a safe location for deploying the scow 8, the scow 8 is deployed by shooting a tag line to shore with a line launcher. The scow 8 has a holdfast 46 which is preferably a ring or a cleat on the bow 14 for attaching the tag line. The scow 8 remains attached to the tow vessel 34 with a towline which is attached to the bow 14 with the holdfast 46. Once the scow 8 is pulled onto the shore, the towline may be removed until it is needed for retrieving the scow 8. In order to easily move the scow 8, it is provided with a plurality of lifting handles 25 on the gunwale 18. The handles 25 are preferably straps that are made of the same material as the flotation chambers 12, which is Hypalon®. The scow 8 is dragged or carried on the shore and debris bags 24 are loaded onto the scow 8. The debris bags 24 are secured on the scow 8 with retention lines and the scow 8 is dragged or carried back to the water. The towline is used to draw the scow 8 through the surf zone and back to the tow vessel 34, where it is attached via the arms 40 to the transom mount 42 on the tow vessel 34. The length of each arm 40 is adjusted to optimize both the distance between the tow vessel 34 and the angle relative to the tow vessel 34. The tow vessel 34 tows the scow to a support vessel where the debris bags 24 are unloaded.

In another embodiment, once the tow vessel 34 reaches a safe location for deploying the scow 8, the scow 8 includes the thrusters 50 and is therefore self-propelled. The microcontroller unit 54 employs the GNSS navigation protocols to navigate the scow 8 to and from the shore. The scow 8 remains attached to the tow vessel 34 with a towline which is attached to the bow 14 with a holdfast 46, which is preferably a ring or a cleat. Once the scow 8 is pulled onto the shore, the towline may be removed until it is needed for retrieving the scow 8. The flap 51 is flipped so that it rests on the deck 20 and is retained with the fastener 55. In this manner, the thrusters 50 are out of the way and are protected. In order to easily move the scow 8, it is provided with a plurality of lifting handles 25 on the gunwale 18. The handles 25 are preferably straps that are made of the same material as the flotation chambers 12, which is Hypalon®. The scow 8 is dragged or carried on the shore and debris bags are loaded onto the scow. The debris bags 24 are secured on the scow 8 with retention lines and the scow 8 is dragged or carried back to the water. The thrusters 50 propel the scow 8 through the surf zone and back to the tow vessel 34, where it is attached via the arms 40 to the transom mount 42 on the tow vessel 34. The length of each arm 40 is adjusted to optimize both the distance between the tow vessel 34 and the angle relative to the tow vessel 34. The tow vessel 34 tows the scow to a support vessel where the debris bags 24 are unloaded.

Figure 8B:
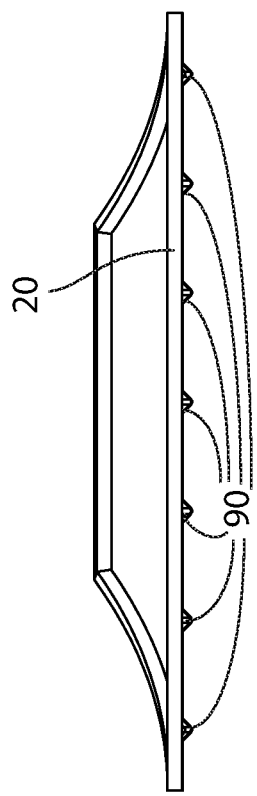
FIG. 8B is a rear view of the scow of FIG. 1.
Figure 8A:
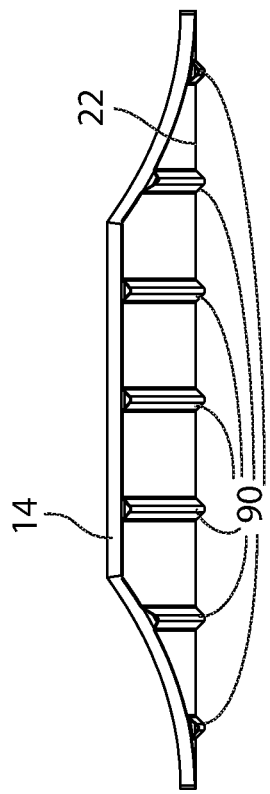
FIG. 8A is a front view of the scow of FIG. 1.

As shown in FIGS. 8A and 8B, the scow 8 has seven strakes 90 integral to the bottom 22 extending from the bow 14 to the stern 20. Without being bound to theory, these provide stiffening to the hull 10 and promote linear travel and controlled turns in the water. The bow 14 is a scow bow and the stern 20 a scow stern.

Figure 9:
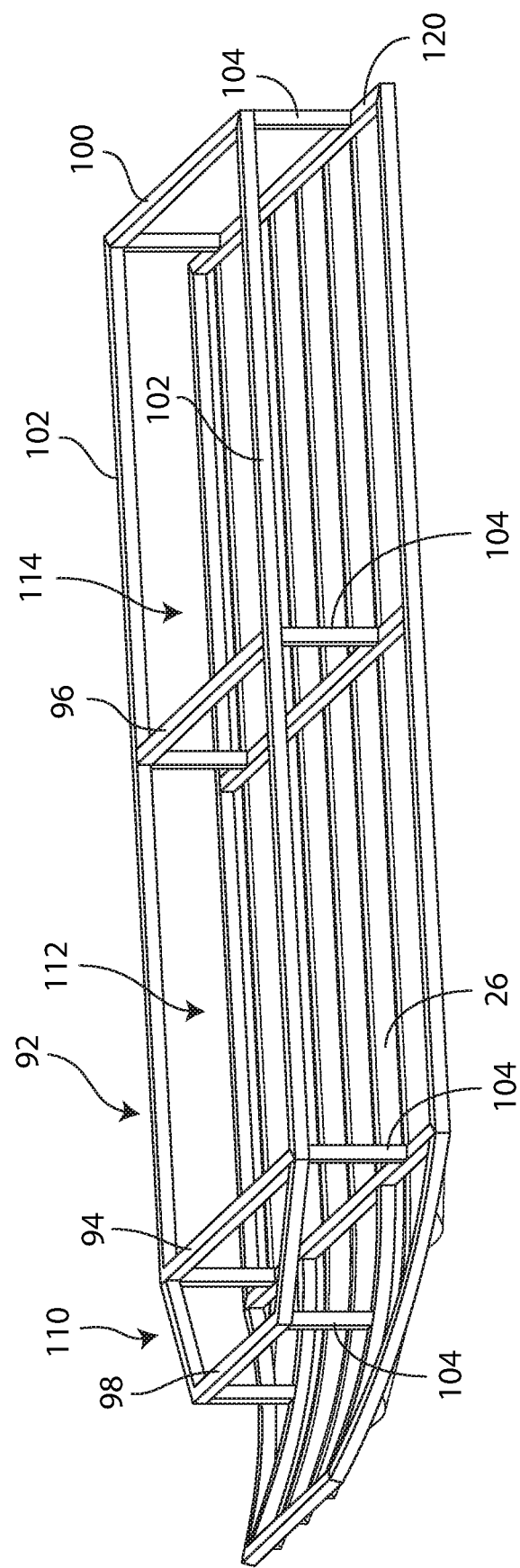
FIG. 9 is a perspective view of the scow of FIG. 1 without the flotation chambers.

As shown in FIG. 9, an upper frame 92 is mounted on the deck 26. The frame 92 retains the flotation chambers 12 and includes a first divider 94, a second divider 96, a bow cross member 98, a stern cross member 100, sides 102 and legs 104. The first divider 94, the bow cross member 98 and the side members 102 form a bow framework 110. The first divider 94, the second divider 96 and the side members 102 form a middle framework 112. A debris bag 24 is retained in the middle framework 112. Similarly, the second divider 96, the stern cross member 100 and the side members 102 form a stern framework 114 in which another debris bag 24 is retained. A lower frame 120 is mounted on the deck 26 and is along its periphery. The lower frame 120 functions to stiffen the deck 26.

Figure 10A:
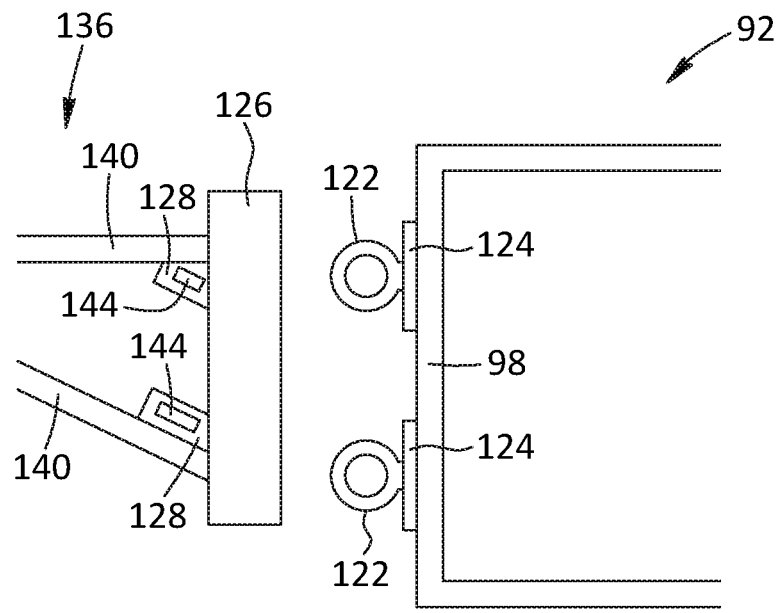
FIG. 10A is a top view of an alternative transom mounting assembly.

As shown in FIG. 10A, in an alternative embodiment, a pair of rings 122 are retained on the stern cross member 100 of the upper frame 92 with a pair of mounting plates 124. The transom mounting assembly, generally referred to as 136, includes a tow bar 126 with a resilient surface. The tow bar 126 is attached to a pair of arms 140, which form part of a framework. Attached to the arms, proximate the tow bar 126 are brackets 128 for retaining clips 144. This assembly 136 is attached to the transom mount 42 of the tow vessel 34.

Figure 10B:
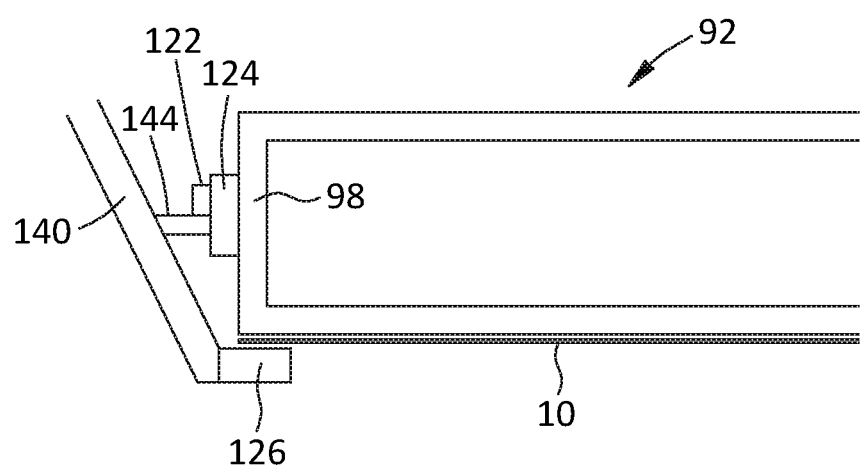
FIG. 10B is a side view of the mounting assembly attached to the stern of the scow.

As shown in FIG. 10B, in use, the tow bar 126 sits below the hull 10 and supports the stern 20 of the scow 8. The clips 144 are spring loaded normally closed clips 144. The clips 144 engage the rings 122 automatically when the scow 8 is lifted onto them by hand, or by utilizing a gaff pole levered on top of the transom mounting assembly 36 from the tow vessel 34. The coupling between the scow 8 and the tow vessel 34 allows for large force vectors and extreme environments, allowing the scow 8 to be transported, deployed, and retrieved by a tow vessel 34 in rough water and waves safely without damaging the tow vessel 34 and scow 8, or putting human life in danger.

The tow bar 126 lifts the stern 20 out of the water, to provide minimal drag for the tow vessel 34, prevent the scow 8 from sinking and allow waves to wash out of the scow 8.

In an alternative embodiment, the coupling is a magnetic coupling between the scow 8 and the tow vessel 34, either to the bow or the stern of the scow. In this embodiment, the clips and the rings are replaced with magnets and paramagnetic or ferromagnetic materials.

The scow 8 is designed to hydroplane at 25-30 knots behind the tow vessel 34 unloaded and 15-18 knots loaded in moderate conditions (Beaufort Scale 1-4).

When used for environmental monitoring, the waterproof, resilient housing 70 houses a microcontroller unit 54 designed to be integrated with all existing oil spill monitoring/detection/response equipment suitable for small vessels including in water, towable, direct, and indirect detection, and monitoring sensors. The housing 70 protects the MCU, Printer Circuit Boards (PCBs), internal peripherals, and cabling. The housing 70 is windproof, shockproof, and dustproof and includes internal temperature, battery voltage, and current draw gauges and a cooling valve. The housing 54 protects military and marine grade interfaces, ports, and disconnects for all external peripherals. The housing 54 is made of lightweight strong high-performance Lexan® polycarbonate resin. It is retained in the scow 8 with isolators to support load and damp vibration and shock. It is insulated and shielded from interference using molded mica or dielectric type insulation.

Figure 11:
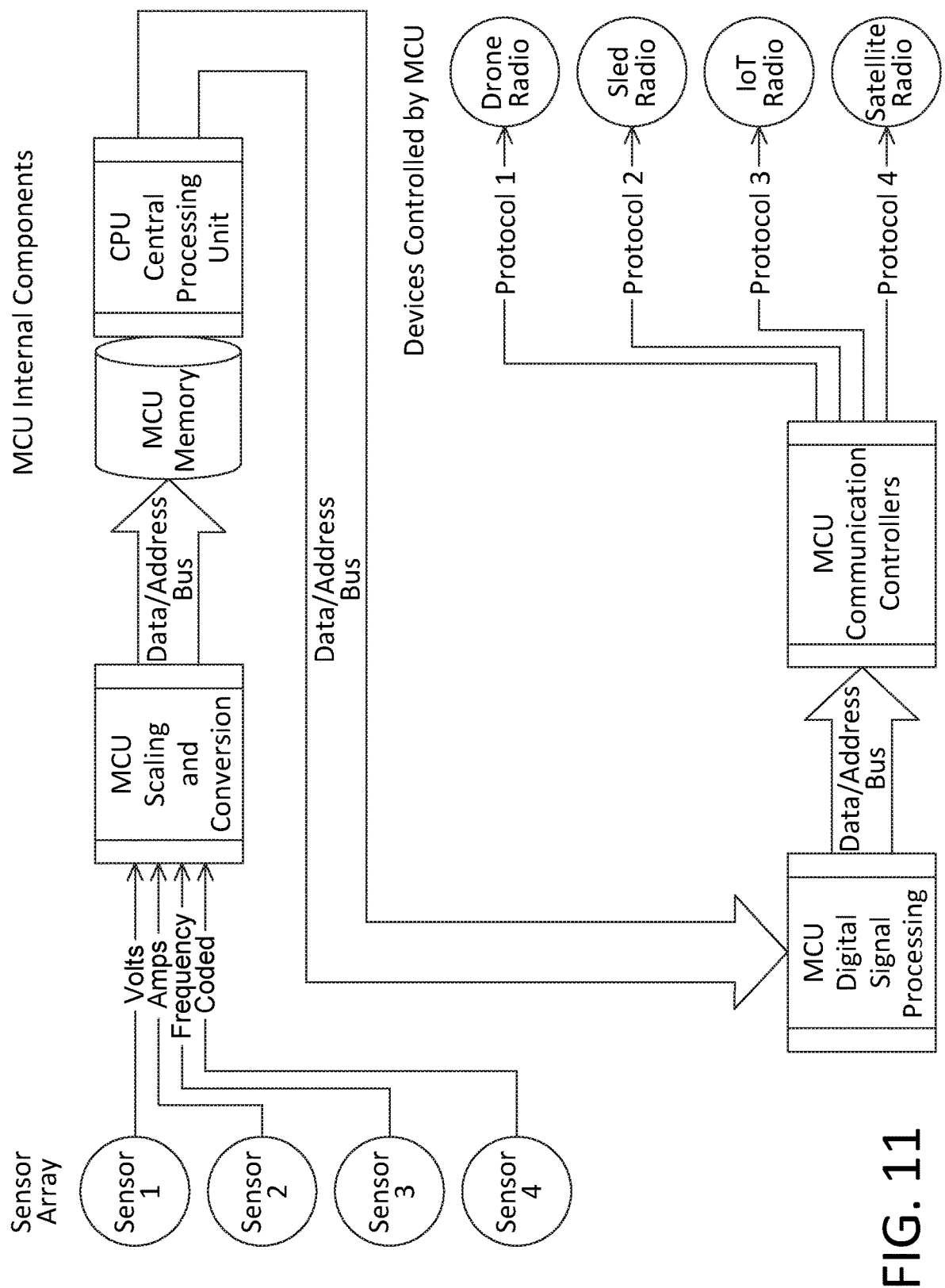
FIG. 11 is a flow diagram showing data acquisition, processing and communications.

As shown in FIG. 11, the MCU 54 receives signals from sensors, scales and converts the signals, sends them to a memory, processes them with a central processing unit, digitizes the signals, and then with a communication controller, sends the digitized signals to a range of radios, databases, web apps, and networks such as, but not limited to:

Enhanced Maritime Situational Awareness (EMSA) system to share data regarding sensitive coastal habitat and critical coastal marine information such as hazards and cultural sites;

Automatic Identification Systems (AIS) network/system to determine position and to share data regarding position, weather, and topography;

IoT/Cellular networks to share large data and video feed via IoT/Cellular modem/radio;

IsatData Pro (IDP)/IoT system to share data reliably remotely via Long Range Wide Area Network (LoRaWAN) via bridged satellites; and Access to latest global satellite networks such as Inmarsat, BGAN, and VSAT depending on the data size and security requirements.

Open Geospatial Consortium (OCG)/Sensor Web Enablement (SWE) Standard including:

Observations & Measurements (O&M)—General models and XML encodings for observations and measurements;

PUCK Protocol Standard—Protocol to retrieve a SensorML description, sensor "driver" code, and other information from the device itself, thus enabling automatic sensor installation, configuration, and operation; and Sensor Model Language (SensorML)—Standard models and XML Schema for describing the processes within sensor and observation processing systems.

The sensors may include, but are not limited to:
Flow characterization sensors providing navigation data (bottom tracking/wave measurement/turbulence).
Float mounted sensors:
Acoustic Doppler Current Profiler (ADCP) providing navigation data (bottom tracking/wave measurement/turbulence);
Fluorometer for determining water quality/solution identification;
Wave Sensor for navigation (dynamic positioning); and
Acoustic Modem for navigation using acoustic sensor arrays.
Tether mounted temperature sensors for determining water quality/solution identification.
Submerged mounted sensors:
Conductivity sensor for determining water quality/solution identification;
Dissolved O2 sensor for determining water quality/solution identification;
Hydrophone(s) for observing and monitoring marine life; and
Fish Tracker for observing and monitoring marine life.
Sensor systems for detection/tracking of oil spills, chemical spills or pollution:
ASD Sensortechnik® BackScat I®
Bowtech® Leak Detection System
Chelsea Technologies® Subsea Pipeline Leak Detection
Chelsea Technologies® UniLux Fluorometer
Chelsea Technologies® UV AquaTrack Fluorometer
CONTROS™ HydroC CH4
CONTROS™ HydroC PAH (POLYAROMATIC HYDROCARBONS)
CONTROS™ Mobile Leak Detection System
Hach FP® 360 SC Oil-in-Water Sensor
Neptune Oceanographic® SNIFFIT®
Ocean Tools Ocean® SENSE Leak Detection
Phaze® Hydrocarbon Leak Detector
Sea & Sun Technology® UV Fluorometer
Seapoint® UV Fluorometer
Smart Light Devices® LDS3 Laser Leak Detection System
Sonardyne® Automatic Leak Detection Sonar (ALDS)
Teledyne® TSS MELDS System
TriOS® enviroFlu-DS
TriOS® enviroFlu-HC
Turner Designs® C3 Submersible Fluorometer
Turner Designs® Cyclops 6K customizable
Turner Designs® Cyclops 7 customizable AADI Oxygen sensor 3830
Weatherford BigEars® Passive Acoustic Leak Detection
AADI® Seaguard O2
AADI® Turbidity Sensor 4112
AML® Oceanographic Smart CTD
CONTROS™ HydroC CO2
Sea & Sun Technology® Conductivity Sensor
Sea Bird® SBE 19plus V2 SeaCAT
Sea Bird® SBE 25 plus Sealogger
Sea Bird SBE 49 FastCAT CTD sensor
Sea Bird® SBE 911 plus; 917 plus
SeaPoint ®Sensors Turbidity Meter
Teledyne® RD Instruments Citadel CTD CT-EK
Wetlabs® WQM
YSI® EXO Series
Sequoia® LISST-Deep
4DEEP® Inwater Imaging Submersible Microscope
AADI® Conductivity Sensor 4319
AADI® Oxygen sensor 3830
AADI® Seaguard O2
AADI ®Turbidity Sensor 4112
AML Oceanographic® Smart CTD
CONTROSTM HydroC CO2
Sea & Sun Technology® Conductivity Sensor
Sea Bird® SBE 19plus V2 SeaCAT
Sea Bird® SBE 25 plus Sealogger
Sea Bird® SBE 49 FastCAT CTD sensor
Sea Bird® SBE 911 plus; 917 plus
SeaPoint® Sensors Turbidity Meter
Teledyne® RD Instruments Citadel CTD CT-EK
Wetlabs® WQM
YSI® EXO Series
Sequoia® LISST-Deep
4DEEP® Inwater Imaging Submersible Microscope The MCU scaling and conversion component polls each sensor at intervals determined by Real-time Operating System intervals and the data are stored in the memory. Each sensor can drive event-driven interruption when a preconfigured threshold is crossed. Once data has been input, scaled and stored, it can be used for decision making and instruction parameters by the MCU. Once the data are scaled and converted, they are sent to the central processing unit where they are input, processed and output with little or no latency. Processing involves comparing data to software comprising configured tables and calculating values using an arithmetic and logic unit. Communication from the MCU 54 to the various radios is through communication controllers that are specific to the protocol. The MCU 54 is configured by firmware and software to run on top of the operating system to provide an interface between the user, input/outputs, systems (drone, base station, applications, etc.)

Figure 12:
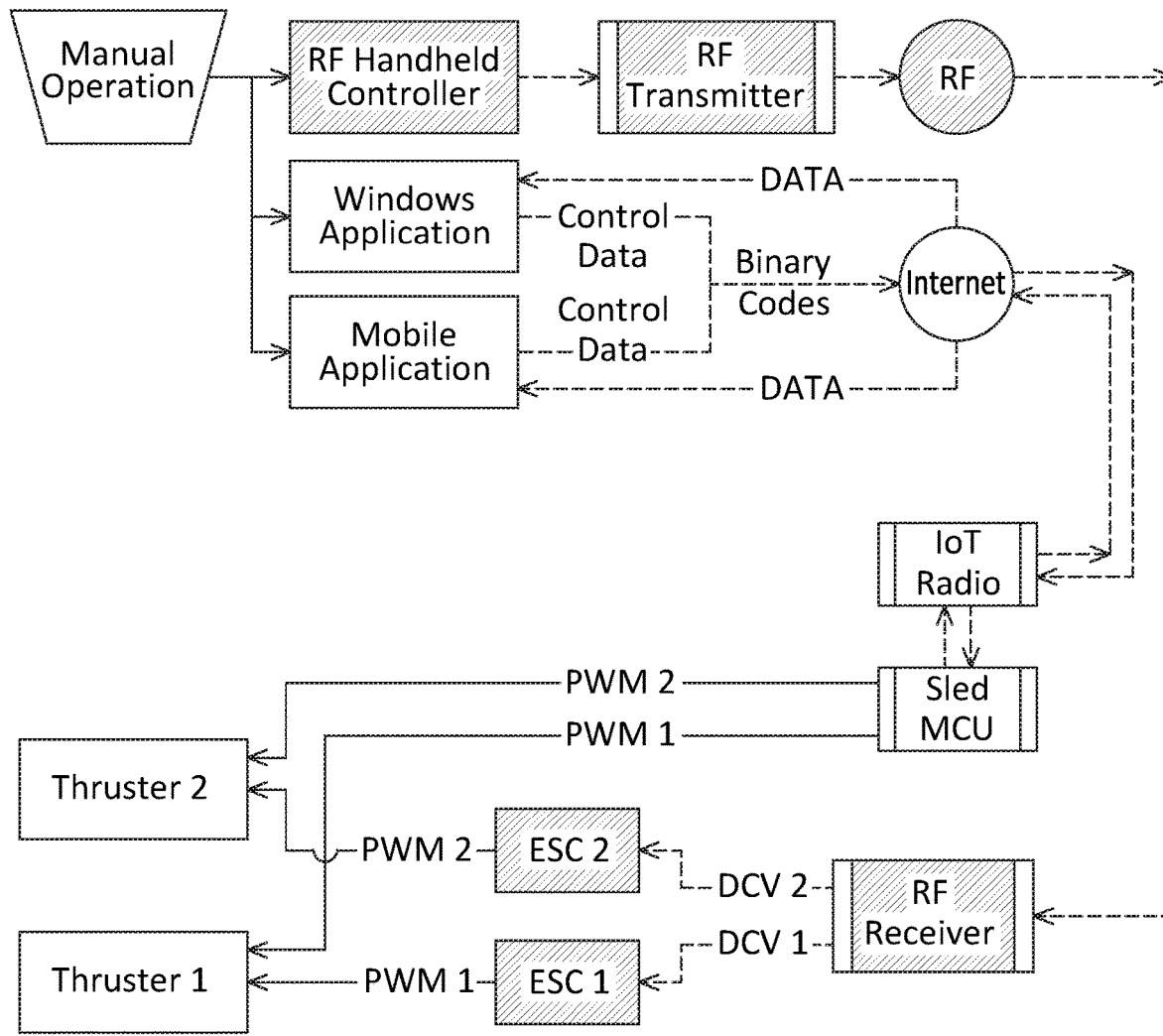
FIG. 12 is a flow diagram showing control of the thrusters.

As shown in FIG. 12, the waterproof, resilient housing 70 also houses the control system for the thrusters 50. The control system may be manually controlled or autonomous. The control system can control propulsion, steering, navigation and communication with the user. The MCU 54 may interact with payload sensors, a compass, a depth sounder, a sonar system, and the like to assist in navigation and steering control. The control system may interact with linear actuators to control thruster trim and to move peripheral sensors. The MCU 54 converts binary codes to control data using telemetry algorithms and feeds back to the application through the Internet of Things.

Additional peripherals include a wave energy convertor (WEC) to charge system batteries and solar panels to charge system batteries.

Figure 14A:
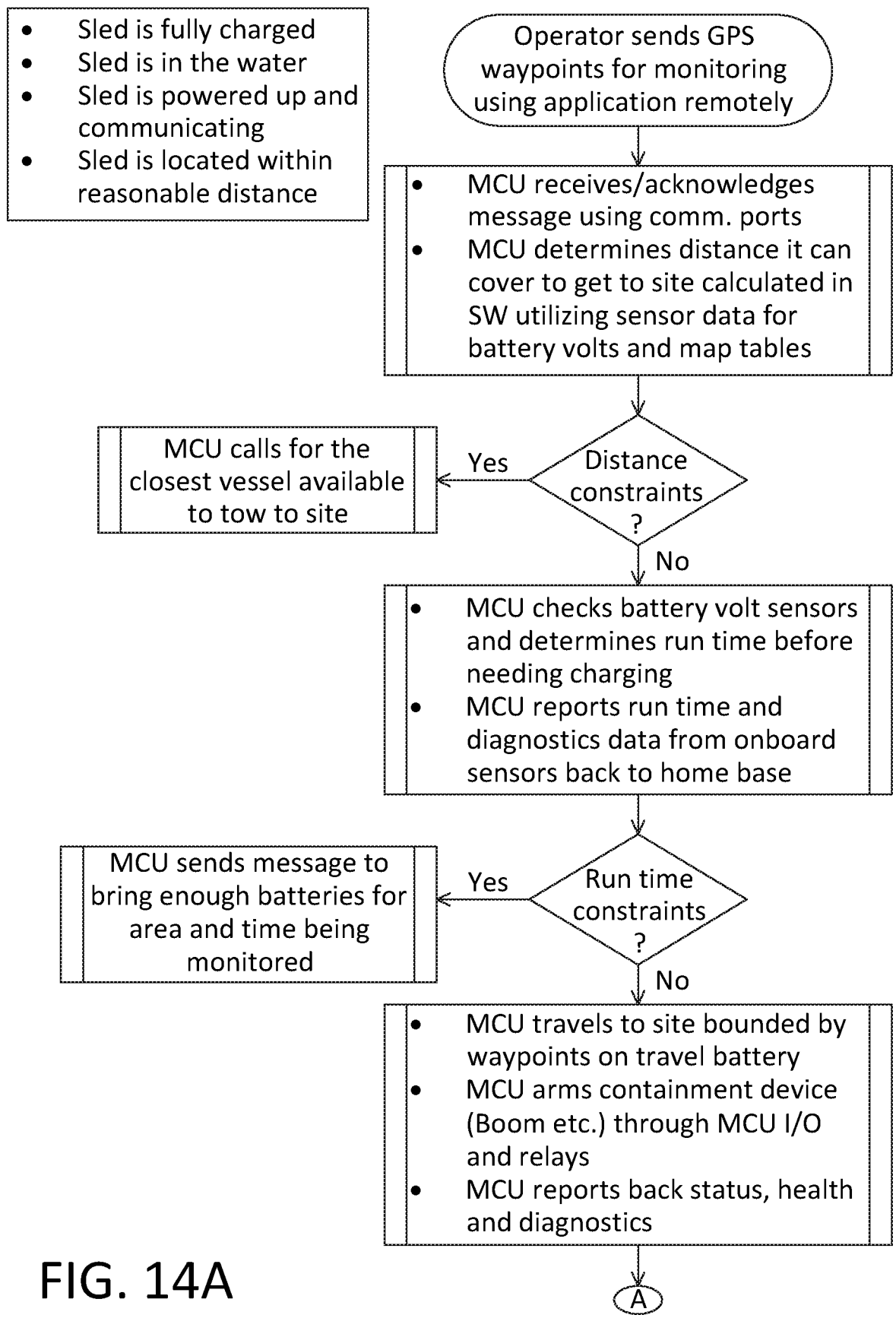
FIG. 14A is a first part of a flow diagram showing an example of autonomous monitoring and response.
Figure 14B:
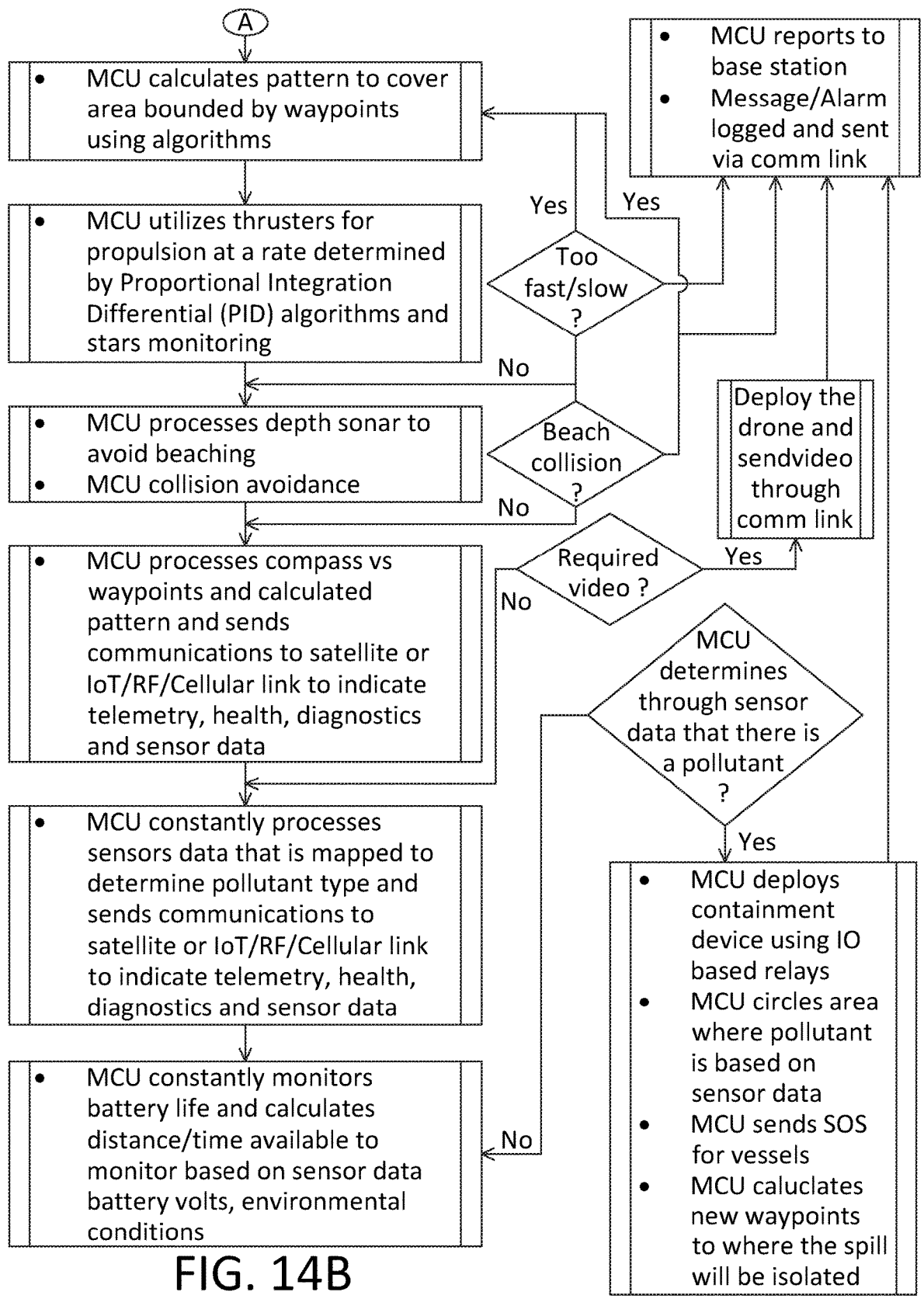
FIG. 14B is a second part of the flow diagram showing an example of autonomous monitoring and response.

As noted in FIGS. 11 and 14B, the MCU 54 interacts with an unmanned aerial vehicle (UAV). The UAV provides porting, tracking, and integration to provide video, navigation, and control data to the MCU 54 and its networks. The UAV may fly ahead of the scow 8 while wirelessly communicating obstacles, rough water, spills, and other hazards to the MCU 54 and its networks ahead of the time acting as an 'eye in the sky'. The UAV therefore communicates visual data to the MCU 54.

Figure 13A:
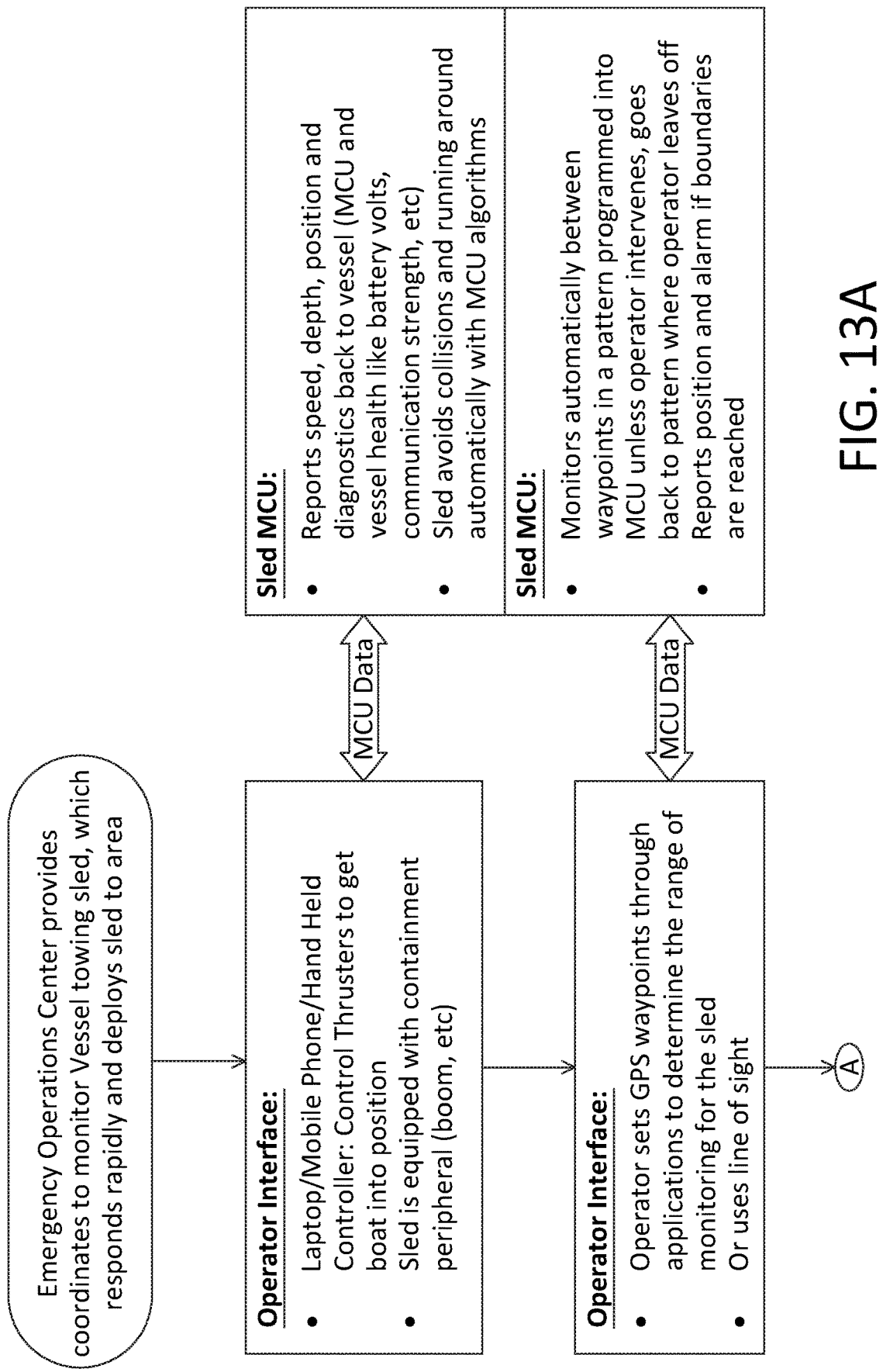
FIG. 13A is a first part of a flow diagram showing an example of user operated monitoring and response.
Figure 13B:
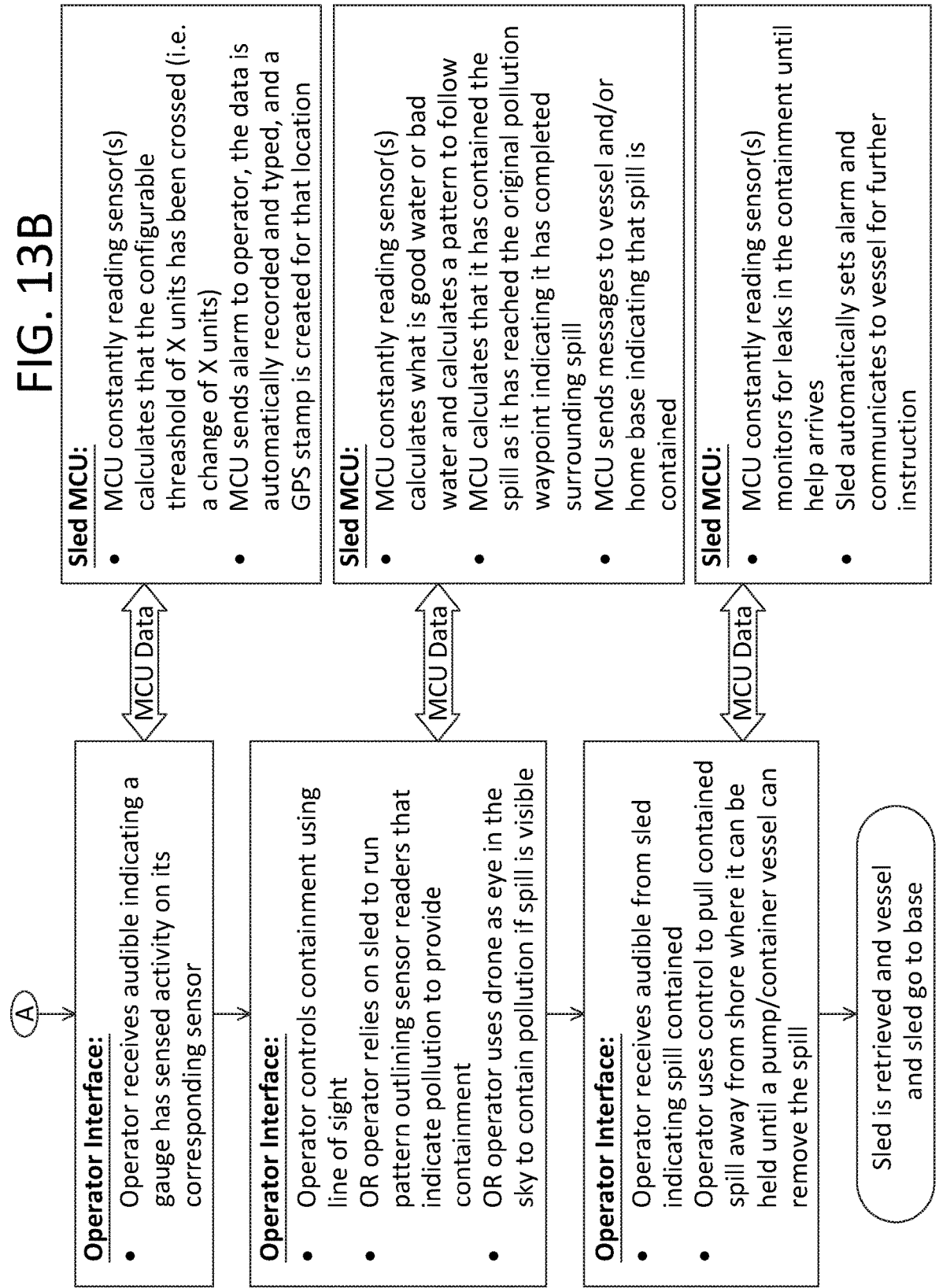
FIG. 13B is a second part of the flow diagram showing an example of user operated monitoring and response.

An exemplary example of an operator-controlled response is shown in FIGS. 13A and 13B. The scow 8 is deployed and its course is set by the operator. The MCU 54 reports position to the operator through an operator interface. Once the operator instructs the MCU 54 to collect data, the MCU 54 reads sensor data and progresses through the steps as outlined in FIG. 11.

An exemplary example of an autonomous response is shown in FIGS. 14A and 14B. The scow 8 is deployed and its course is sent to the MCU 54 by the operator. The MCU 54 reports position to the operator through an operator interface. The MCU 54 determines a pattern for monitoring the site, controls positioning and speed, processes data from sensors, sonar system and depth sounder and progresses through the steps as outlined in FIG. 11 autonomously. The UAV may be employed to provide video of the site and to send information relating to obstacles, rough water, spills, and other hazards to the MCU 54 and its networks ahead of the time acting as an 'eye in the sky'.

This exemplary example represents one of many options how an area equipped with a scow system would be able to utilize automatic monitoring and response of an area over time. The operator, through an application, only has to communicate with the scow's MCU 54 through either satellite (VSAT) or cellular IoT/RF link to determine waypoints and the MCU 54 calculates what it can do. The MCU 54 drives propulsion, drives control relays for equipment regulation, sense collision/beaching avoidance, sense pollutant detection, calculates polluted area detection, and performs pollutant containment through relay-controlled equipment. This is achieved by the MCU 54 which is already configured to take in sensor data, scale/filter it, use it in calculations, and compare against configurable tables in memory to satisfy functional requirement of the system. Configurable tables may represent co-ordinate mapping, wave speed and size data, and the like to compare data to and perform calculation and control through the software. Communications are already set up in the MCU 54 to communicate at the desired protocols to the desired interface through an IoT/Cellular or VSAT satellite account. The MCU 54 constantly reports back to the operator application/controller the health of the scow 8, sensor data, gauge information, and more through a full-stack environment from device to server/database to application in real time.

Examples of monitoring that the scow with the microcontroller unit can perform include: stock assessment of crab, prawn and shrimp; acoustics aquaculture for transport of materials and people; monitoring fecal matter and other organics; monitoring inorganics such as nitrogen, oxygen and phosphate; salmon and halibut stock assessment using acoustics or eDNA; camera biodiversity seafloor integrity and habitat mapping; taxon mapping eDNA for stock assessment and invasive species, for example green crab; spill monitoring using passive sampling; bilge water or grey/blackwater detection; water quality monitoring; acoustical monitoring—SSSONar MBES, Single BEAM; eelgrass and other sea weeds monitoring; monitoring marine litter; monitoring marine noise; monitoring marine mammals; intertidal, bivalve bed and estuary monitoring using the UAV; and spill monitoring and cleanup using containment, surfactants and/or dispersants.

As would be known to one skilled in the art, the marine scow can carry any payload, including, but not limited to, personnel and equipment such as environmental, oceanographic, and marine monitoring equipment and can conduct a wide range of activities including monitoring, containment and cleanup, either autonomously or under the control of an operator.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A marine environmental monitoring scow, the marine environmental monitoring scow comprising: a hull which includes an open stern, a bow opposite the open stern, a deck extending between the open stern and the bow and forming a bottom on an underside, the bottom extending between the open stern and the bow; a frame, the frame which is attached to the deck, the frame including a front, a back which is opposite the front and sides extending between the front and the back; a pair of flotation chambers which extend along the sides; a housing mounted on the deck; and a microcontroller unit housed in the housing, the microcontroller unit configured to receive a data set from at least one sensor, to store the data set, to process the data set into a processed data set and to send the processed data set to a receiver.

2. The marine environmental monitoring scow of claim 1 further comprising at least one flap pivotally mounted on the back of the frame.

3. The marine environmental monitoring scow of claim 2, further comprising one or more thrusters mounted on the flap.

4. The marine environmental monitoring scow of claim 3, wherein the microcontroller unit is in electronic communication with the thrusters.

5. The marine environmental monitoring scow of claim 4, wherein the bottom of the hull includes a plurality of strakes which extend from the bow to the stern.

6. A combination of a transom mounting assembly, a scow, and a tow vessel, the transom mounting assembly mounted on the tow vessel and including at least two arms and a pair of clips proximate a terminal end of each arm, the scow releasably attached to the tow vessel with the clips of the transom mounting assembly, wherein the scow comprises: a hull which includes an open stern, a bow opposite the open stern, a deck extending between the open stern and the bow and forming a bottom on an underside, the bottom extending between the open stern and the bow; a frame, the frame which is attached to the deck, the frame including a front, a back which is opposite the front and sides extending between the front and the back; and a pair of flotation chambers which extends along the sides.

7. The combination of claim 6, further comprising a flap which is hingedly attached to the deck proximate the open stern.

8. The combination of claim 7, further comprising one or more thrusters mounted on the flap.

9. The combination of claim 8, wherein the transom mounting assembly includes a tow bar, the tow bar mounted on the terminal ends of the arms for locating underneath the hull proximate the stern.

10. The combination of claim 9, further comprising a pair of rings mounted on the back of the frame of the scow for releasably attaching the arms.

11. The combination of claim 10, further comprising a housing mounted on the scow and a microcontroller unit housed in the housing, the microcontroller unit configured to receive a data set from at least one sensor, to store the data set, to process the data set into a processed data set and to send the processed data set to a radio.

12. The combination of claim 11, further comprising at least one environmental monitoring sensor.

13. The combination of claim 12, wherein the microcontroller unit is in electronic communication with the thrusters.

14. The marine environmental monitoring scow of claim 3 further comprising at least one environmental monitoring sensor.

\* \* \* \* \*